United States Patent
Byström et al.

(10) Patent No.: US 7,588,192 B2
(45) Date of Patent: Sep. 15, 2009

(54) HARD COPY PROTECTION AND CONFIRMATION METHOD

(75) Inventors: Tomas Byström, London (GB); Dean Lynn, Ware (GB); Andy Jordan, Harpenden (GB); Thomas Chase, Welwyn Garden City (GB); Satyan Vadher, Wembley (GB)

(73) Assignee: Xerox Corporation, Norwalk, CT (US)

( * ) Notice: Subject to any disclaimer, the term of this patent is extended or adjusted under 35 U.S.C. 154(b) by 686 days.

(21) Appl. No.: 11/336,485

(22) Filed: Jan. 20, 2006

(65) Prior Publication Data

US 2007/0170250 A1 Jul. 26, 2007

(51) Int. Cl.
*G06K 19/06* (2006.01)

(52) U.S. Cl. ...................... 235/494; 235/375

(58) Field of Classification Search ................ 235/494, 235/375; 713/176, 179
See application file for complete search history.

(56) References Cited

U.S. PATENT DOCUMENTS

| 5,221,833 | A | 6/1993 | Hecht | |
|---|---|---|---|---|
| 5,245,165 | A | 9/1993 | Zhang | |
| 5,315,098 | A | 5/1994 | Tow | |
| 5,734,752 | A | 3/1998 | Knox | |
| 6,993,655 | B1 * | 1/2006 | Hecht et al. | 713/176 |
| 2001/0008557 | A1 * | 7/2001 | Stefik et al. | 380/202 |
| 2002/0195501 | A1 | 12/2002 | Mazaika | |
| 2006/0157574 | A1 * | 7/2006 | Farrar et al. | 235/494 |
| 2006/0259983 | A1 * | 11/2006 | Sperry | 726/28 |
| 2007/0136588 | A1 * | 6/2007 | DeYoung et al. | 713/171 |
| 2007/0168294 | A1 * | 7/2007 | Tsurukawa | 705/59 |
| 2007/0170248 | A1 * | 7/2007 | Brundage et al. | 235/380 |

* cited by examiner

*Primary Examiner*—Ahshik Kim
(74) *Attorney, Agent, or Firm*—Fay Sharpe LLP

(57) ABSTRACT

The introduction of an integrated data glyph, watermark, and thumb print system enables copy protection via a multi-functional device. The device, working with a secure remote server, produces a unique data glyph for each document that the user wishes to protect. Different copy protection strengths are possible and the reproduction of the document is fully controllable.

9 Claims, 5 Drawing Sheets

HARD COPY PROTECTION AND CONFIRMATION METHOD

BACKGROUND

The exemplary embodiment described herein is related to the field of electrophotographic image reproduction and, more particularly, relates to the protection and confirmation of hard copies of image data.

The introduction of the plain paper copier has resulted in a proliferation of paper copies of paper originals. A similar result is happening to electronic images, given the easy availability of scanners and a quick and widespread access to images throughout the Internet. It is now very difficult for the creator of an image to generate an electronic original, for which he can be assured that illegal copies will not be spread to third parties. It is no wonder that the copying of confidential documents is a concern to business owners and the like. Unauthorized copying and distribution of confidential customer data, financial records, employee information, product specifications and other sensitive documents can lead to disaster. Leaks of confidential information can result in lost revenue, compromised ability to compete, unfairness in purchasing and hiring decisions, diminished customer confidence and more. For instance, if a company's payroll report gets circulated, it could end up with disgruntled employees. Accordingly, attempts to protect the hardcopy have been devised, including watermarks and security paper.

In a paper document, a watermark is a physical design embossed or pressed into the paper that can be seen when the page is held up to a light. In an electronic document, watermarks come in two forms: visible and invisible. A visible watermark is usually a faint background image superimposed on the document image, but if well done, it will appear to be "under" the image, as if the image on the screen were an image of an original printed on watermarked paper. Invisible watermarks are often not images at all but patternless arrangements of bits hidden in an image or sound file which are recovered from the file through a decoding application. For example, U.S. Pat. No. 5,734,752 to Knox, entitled "Digital Watermarking Using Stochastic Screen Patterns" and incorporated by reference herein, discloses a method for generating watermarks in a digitally reproducible document that are substantially invisible when viewed.

One function of a visible digital watermark is to make it apparent to a user that a document is owned and by whom. A visible watermark itself is typically a fairly complex design to make forgery difficult. Unfortunately, the technology for imprinting watermarks into digital images can be readily obtained, and as programs can be written to accurately recover a watermark from a digital image, digital forgery can be accomplished by any skilled person using a desktop computer. By specially designing the graphic used as a watermark, electronic watermarks can be created which are only visible when an image is printed, and do not appear on screen images. Such techniques were developed to block counterfeiting of financial documents using photocopiers or laser printers, and depends on particular features of the way today's copiers and printers are constructed. Likewise, invisible watermarks are also intended to record the legal source of a document, (which may be the copyright owner), but in such a way to be undetectable by the user.

Security paper may also be used to help prevent the unauthorized duplication of a printed document. Security paper is paper that has been "engineered and manufactured" and incorporates physical features imbedded into the paper itself to resist the document forgery and the copying of negotiable documents when these documents are printed on MICR Laser printers. The paper is fully compliant with the physical paper standards of weight, grain direction, moisture content etc. for MICR Laser printers but has additional "chemical and fiber fraud resistant features" built into the paper during the manufacturing process. Plain laser printer paper meets the physical standards of the Laser printer but does not possess any of the capabilities of fiber, chemical, or external processes that make "security paper" fraud resistant and tamper proof. Security paper provides assistance to a financial institutions "back office processing" of checks by making check fraud tampering attempts physically obvious to the institutions check review personnel and prompts the reviewer to look at the document more closely for any form of tampering prior to the check being cleared for payment by the institution. The features themselves cannot be readily copied or reproduced via conventional reproduction processes. Security papers are used, for example, in stopping forged checks from being cleared and paid against business accounts. However, a document that contains a security feature such as a "VOID" background may be easily duplicated on some photo copiers without the word VOID showing up on the copy.

In view of the foregoing issues, there is a need for a more secure method for protecting and confirming printed documents.

BRIEF DESCRIPTION

Disclosed herein is a process for controlling the copying of confidential documents by integrating a data glyph, a thumbprint, and a watermark into a document. When "copy protection" is selected by the user when submitting a job for printing or copying, the device will place the appropriate marks on each page of the job for reference later when authorizing additional reprints of the job. When copy protected jobs are submitted, the device extracts the marks from the job in order to authorize the copy request. Data glyphs are generated by a remote server and placed on each page by the printer. The data glyphs contain a unique ID for the job and are used to reference the document back to the document settings stored on the server. Thumb prints are also generated on the device and placed on each page. The thumb prints are used as a reference point to verify that each page is unaltered. Further, watermarks are placed on each page and serve as an indicator that the document is copy protected. Thus, if the data glyph was somehow removed, the device could still detect the thumb print and/or the watermark and reject the job. The user would also be able to modify "input protection" or "strength," which increases the strength of the thumb print algorithm by increasing the number of reference points, add a "Copy Count" which will limit the number of copies, "password protect" the document by requiring the user to also submit a password to make copies, adding a "protect until" date, which would prevent any copies until the date has passed. Each of the user programmed attributes, namely, Strength, Copy Count, Password Protect and Protect Until are stored on the remote server with the data glyph reference and thumbnail prints.

In one embodiment, a copy protection method comprises receiving copy protection data for a digital document from a user, sending the copy protection data for the digital document to a remote server, receiving an encrypted ID for the digital document from the remote server, generating a data glyph incorporating the encrypted ID and adding it to the digital document, generating a unique thumb print of the digital document and adding it to the digital document, adding a watermark to the digital document; and printing a hard copy of the digital document via an image formation device.

In another embodiment, a copy protection method comprises receiving copy protection data for a digital document from an image processing device, generating a unique encrypted ID for the digital document, storing the copy protection data and the encrypted ID in a database, and sending the encrypted ID to the image processing device.

In yet another embodiment, a copy confirmation method comprises scanning a document via an image reproduction device, identifying the document as copy protected via encrypted glyph data in the document, creating a secure connection to a remote server, sending encrypted glyph data to the remote server, receiving a thumb print and a copy password for the document, cross-checking the scanned document with the thumb print, requesting a copy password from the user, printing at least one hard copy of the document, and sending the remote server an acknowledgement of the printing of the document.

In yet another embodiment, a copy confirmation method comprises receiving encrypted glyph data for a document from an image reproduction device, decrypting the encrypted glyph data into an ID, loading copy protection data for the document using the ID, verifying that the document may be copied based on the copy protection data, sending a document password and grid reference data to the image reproduction device, and receiving print count data from the image reproduction device.

DETAILED DESCRIPTION

The detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU, and the maintenance of these bits within data structures that reside in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

The operating environment in which the exemplary embodiment is used encompasses general distributed computing systems wherein general purpose computers, work stations, or personal computers are connected via communication links of various types. In a client server arrangement, programs and data, many in the form of objects, are made available by various members of the system.

Figure 1:
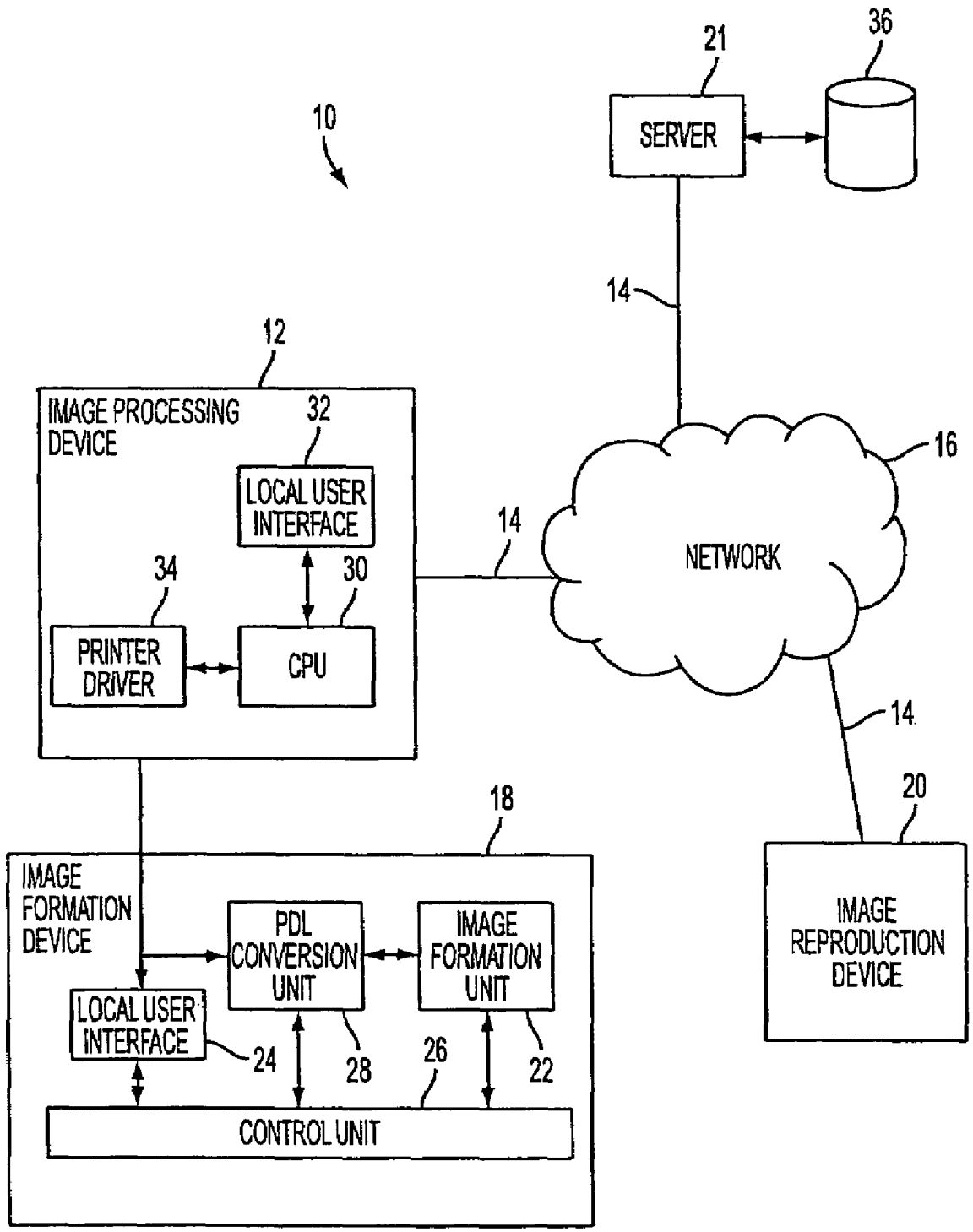
FIG. 1 is a block diagram of a system suitable for creating and confirming a hard copy secure document, according to aspects of the exemplary embodiment.

Turning now to the drawings, FIG. 1 is a block diagram showing an example of a system 10 suitable for implementing the hardcopy protection and confirmation process described below. As shown in FIG. 1, a reference number 12 denotes an image processing device (e.g., a personal computer, workstation or the like), 14 denotes any number of telecommunication lines, 16 denotes a telecommunications network connecting the system elements via the telecommunication lines 14, 18 denotes an image formation device (e.g., a color printer, fax machine, photocopier, or other image formation device), 20 denotes an image reproduction device (e.g., a facsimile machine, image scanner, photocopier, or other device, which reproduces images using electrophotographic, xerographic, or other technology to form a hard copy), and 21 denotes a secure remote server.

The image processing device 12 represents image data to be printed by the image formation device 18 and outputs it to the image formation device 18 via the telecommunication line 14. The telecommunication lines 14 may also comprise a computer network such as LAN and a public line or a WAN and may also be directly connected by a cable.

The image formation device 18 includes an image formation unit 22, a local user interface 24, a control unit 26, a PDL conversion unit 28, and other elements. The image formation unit 22 forms an image on suitable media (e.g., paper), based upon output image data from the image processing device 12. The control unit 26 controls the operation of the whole image formation device 18.

Documents displayed on the image processing device 12 connected to a network are typically converted to a page description language (PDL), such as Adobe PostScript, Adobe PDF, or Hewlett-Packard PCL (Printer Command Language), before being sent to the image formation device 18. The image formation device 18 connected to the network interprets sent PDL, generates raster data of resolution suitable for the resolution of the printer and finally prints an image on paper or other suitable media. The image processing device 12 typically includes a CPU 30, a local user interface 32, and a printer driver 34, among other things. The printer driver 34 is a piece of software that converts the data to be printed to the form specific to the image formation device 16. The purpose of the printer driver 34 is to allow applications to do printing without being aware of the technical details of each type of image formation device. For example, PostScript printer drivers create a file that is accepted by PostScript printers, Hewlett-Packard (HP) printer drivers create PCL files and so on. Drivers for Windows-only printers rasterize the pages (RIP function) and send the actual bit patterns to the printer, which are applied to the drum by the laser or LED array.

As stated earlier, the printer driver 34 converts the image to a PDL, such as PostScript or PCL. PostScript is a page description language optimized for printing graphics and text (whether on paper, film, or CRT is immaterial). The main purpose of PostScript is to provide a convenient language in which to describe images in a device independent manner. This device independence means that the image is described without reference to any specific device features (e.g. printer resolution) so that the same description could be used on any PostScript printer (say, a LaserWriter or a Linotron) without modification. The language itself, which is typically interpreted, is stack-based in the same manner as an RPN calculator. A program pushes arguments to an operator onto a stack and then invokes the operator. Typically, the operator will have some result which is left at the top of the stack. PCL is the page description language for HP LaserJet printers. It has become a de facto standard used in many printers and typesetters.

The image reproduction device 20 reproduces a hard copy or otherwise tangible copy of the document. As used herein, the term "hard copy" refers to a permanent reproduction, on any media suitable for direct use by a person (in particular paper), of displayed or transmitted data. Examples of hard copy include teleprinter pages, continuous printed tapes, facsimile pages, computer printouts, and radiophoto prints.

The secure server 21 offers a single area for receiving all the protection data for all documents generated on all machines that support glyph protection technology. Data on the server 21 may be stored in a database 36 and dynamically updated inline with copies made, e.g. copy count incremented with each copy made, and this data can then be used to refuse any copies beyond the selected maximum.

Figure 2:
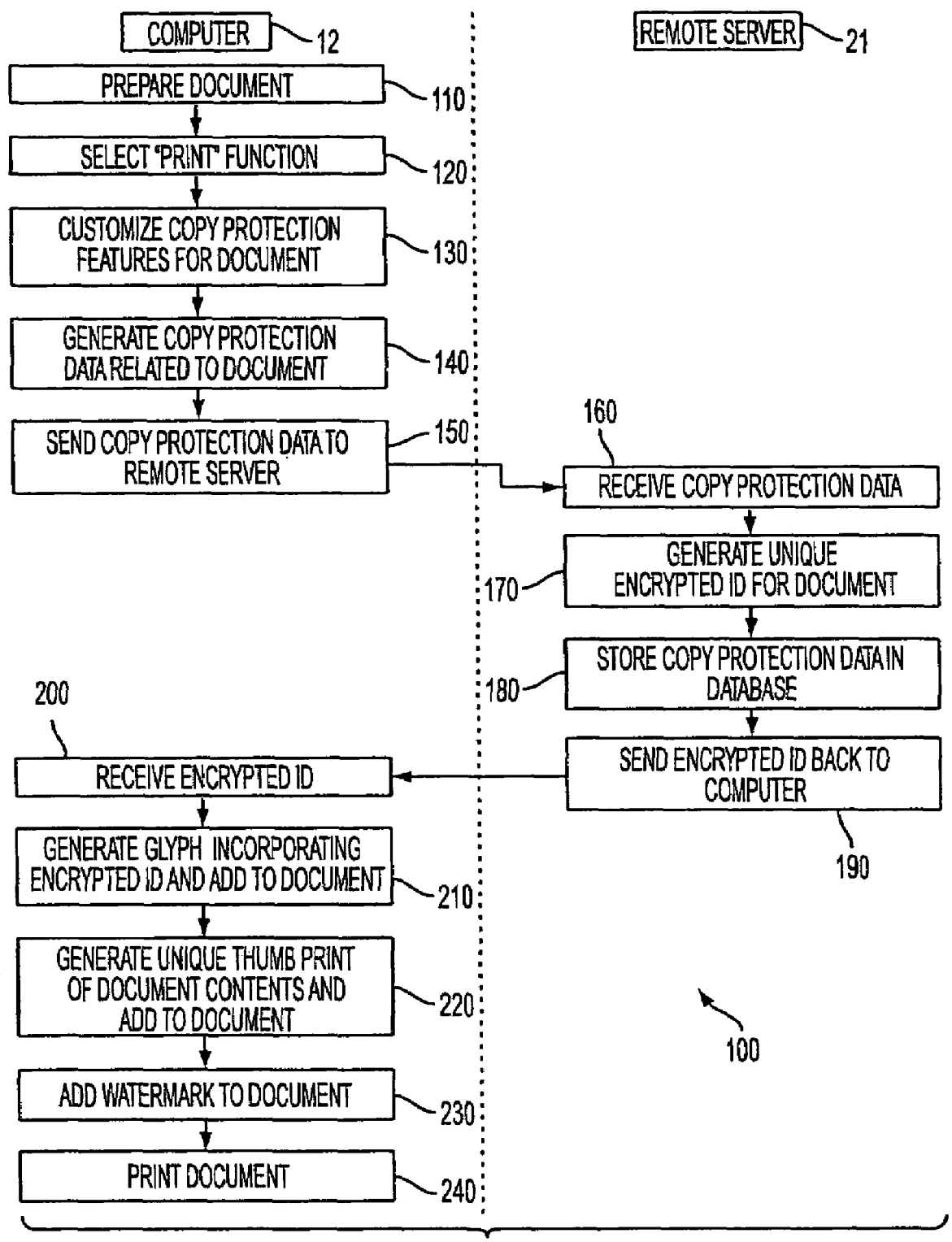
FIG. 2 is a flow chart illustrating a method for creating a hardcopy secure document.

With reference to FIG. 2, a method 100 for securing a printed document is illustrated. Initially, a digital document is prepared and stored on the image processing device 12 (110). The digital document may be generated directly on the image processing device 12 by the user via the local user interface 32 or it may have been sent to the image processing device 12 via a local network or the Internet (e.g., by email). At this point, the user invokes the "Print" function on the image processing device 12 (120). The user then establishes the parameters for creating a secure document (130). More particularly, the user would select a feature such as "Copy Protection" from among the print driver properties list on the local user interface 32. The user would then customize the security of the digital document through a list of options. These options may include, for example, Strength, Copy Count, Password Protection, and Protect Until, as listed below:

Strength—With this option, the user would be given the choice of possible security "strengths."

Copy Count—This option allows the user to control the amount of copies that can be made of the original document.

Password Protection—This option permits the user to add a password, which would then be required when creating one or more copies of the original.

Protect Until xx/xx/xxxx—With this option, the user may enter a date until which the document is to be protected. After this date the document may be reproduced at will.

After the user has selected all of the appropriate options in the print driver 34 and acknowledges that the digital document is now ready to be printed, the image processing device 12 generates the copy protection data related to the document (140) and sends the copy protection data to the secure server 21 (150). The secure server 21 receives the copy protection data for the document (160) and generates a unique, encrypted ID to be stored in the glyph that links the printed document to the stored data (170). This encrypted ID relates to the set of document properties established earlier. The copy protection data is then stored in the database 36 (180).

Figure 3:
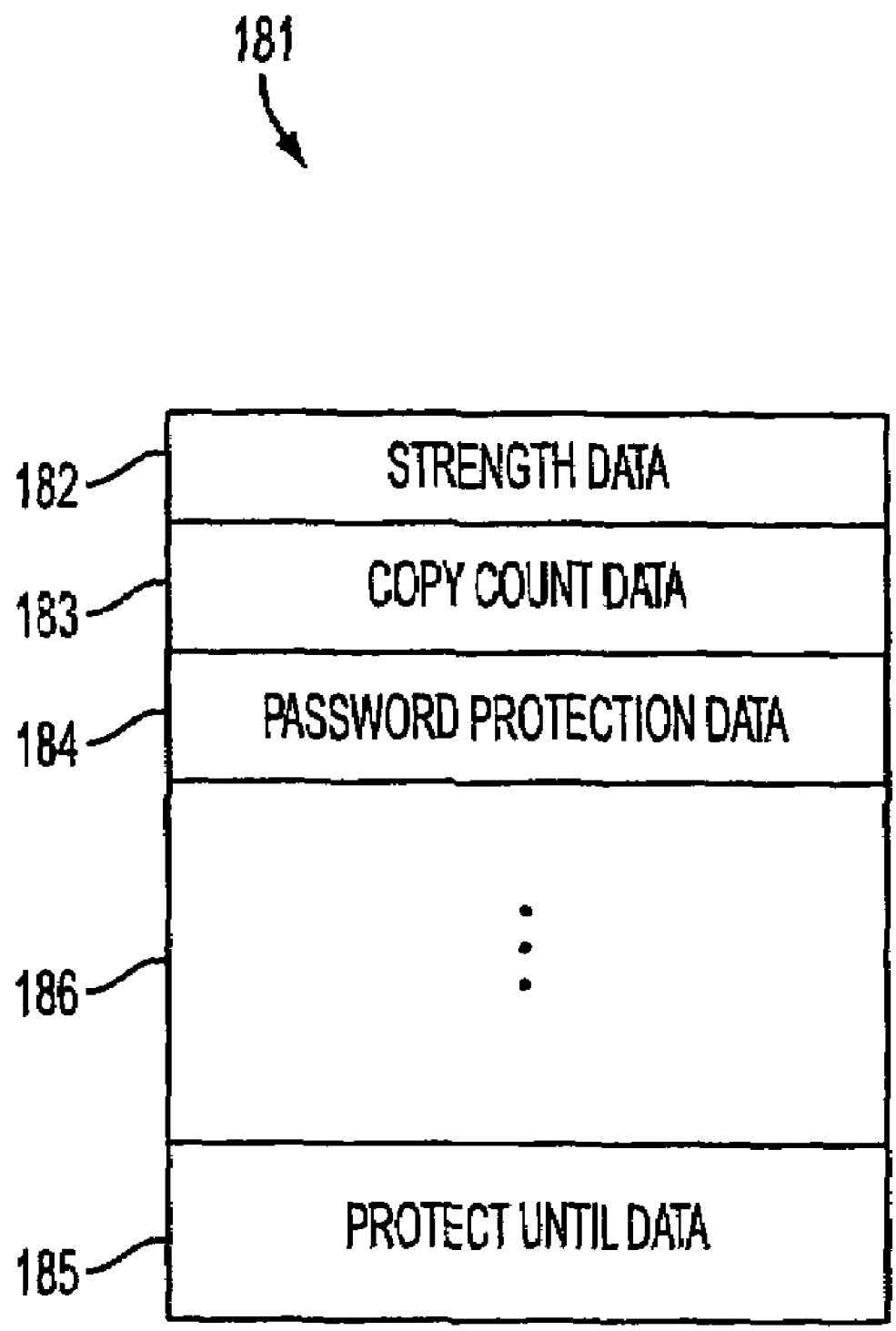
FIG. 3 is a memory layout of data stored in a database in accordance with an aspect of the exemplary embodiment.

Turning now to FIG. 3, the database 36 includes any number of data sub-blocks. They are shown as a super block 181, not all of whose fields are filled. The super block 181, as known in the art, can be accessed from the identity of any one of several fields in the super block 181. The super block 181 includes any number of data sub-blocks, each of which contains copy protection data. For example, data sub-block 182 contains copy strength data, data sub-block 183 contains copy count data, data sub-block 184 contains password protection data, data sub-block 185 contains "protect until" data, and additional sub-blocks 186 may be provided in the super block 181 for storing other types of data useful in implementing the copy protection and confirmation process described below.

Meanwhile, the encrypted ID is sent back to the image processing device 12 to be stored on the hard copy of the document in an encoded format such as a data glyph (190). Upon receiving the encrypted ID (200), the image processing device 12 generates at least one glyph incorporating the encrypted ID and adds it to the document (210).

The technique of embedding encoded information into paper documents using data glyph technology has been widely practiced for more than twenty years. It is particularly advantageous for use in document applications that require a high density rate of embedded data and require the embedded data to be robust for decoding purposes.

Glyphs differ from watermarks in that the glyphs encode information via some numerical method, while watermarks represent the actual image. The glyphs may be machine readable by means of human invisible characteristics of the print materials, such as their infrared reflectivity, their high resolution spectral detail, their metameric spectral characteristics, or their magnetization. These machine detectable materials may be incorporated into the same printing process that is employed for printing the human readable rendering, such as by utilizing xerographic toners which have machine recognizable, human invisible characteristics, together with their usual visible characteristics of color, whiteness, blackness, transparency and opacity. Thus, a stream of data can be represented by glyphs each line varying in orientation in order to provide an encoded view of the information.

Data glyph technology encodes digital information in the form of binary 1s and 0s that are then rendered in the form of distinguishable shaped marks such as very small, linear marks. Generally, each small mark represents a digit of binary data; whether the particular digit is a digital 1 or 0 depends on the linear orientation of the particular mark. For example, marks that are oriented from top left to bottom right may represent a "0," while marks oriented from bottom left to top right may represent a "1." The individual marks are of such a small size relative to the maximum resolution of a black and white printing device so as to produce an overall visual effect to a casual observer of a uniformly gray halftone area when a large number of such marks are printed together in a black and white image on paper. When incorporated in an image border or graphic, this uniformly gray halftone area does not explicitly suggest that embedded data is present in the document.

However, a viewer of the image could detect that the small dots forming the gray halftone area are a series of small marks that together bear binary information.

Some examples of U.S. patents on data glyph technology include U.S. Pat. Nos. 5,221,833, 5,245,165, and 5,315,098, the disclosures of which are incorporated by reference herein in their entirety. For example, U.S. Pat. No. 5,221,833, entitled "Methods and Means for Reducing Error Rates in Reading Self-Clocking Glyph Codes," discloses a method for encoding n-bit long multi-bit digital values in a pre-ordered cyclical sequence based on their analytically or empirically determined probabilities of being confused with each other, such that each glyph is adjacent in that sequence to the two glyphs with which it is more likely to be confused during decoding.

Also, U.S. Pat. No. 5,245,165, entitled "Self-Clocking Glyph Code for Encoding Dual Bit Digital Values Robustly," discloses a method for encoding dual bit digital values in the cardinal rotations (0 degrees, 90 degrees, 180 degrees, and 270 degrees) of a logically ordered sequence of wedge-shaped glyphs (essentially right triangles) that are written, printed or otherwise recorded on a hardcopy recording medium with a predetermined spatial formatting rule. The widths of the glyphs vary unidirectionally as a function of their height, so they can be decoded reliably, even when they are degraded by scan errors, dropped scan lines and/or random noise patterns.

A system and method for encoding digital data in halftone images is disclosed in U.S. Pat. No. 5,315,098 to Tow, entitled "Methods and Means for Embedding Machine Readable Digital Data in Halftone Images." In Tow, digital data is encoded in the angular orientation of circularly asymmetric halftone dot patterns that are written into the halftone cells of digital halftone images. The sizes of the halftone dot patterns are modulated in accordance with grayscale data sample values that are provided to define the image. The patterns are modulated so that the average reflectance or transmittance of each of the halftone cells is modulated to provide a more or less standard halftone rendering of the image. By modulating the angular orientation of the halftone dot patterns, digital data is encoded within the halftone image. The digital data can then be scanned into a computer, decoded and later processed. Tow sets aside crosshatched pixels to function as dedicated background pixels to simplify the task of discriminating between their different angular orientations.

Figure 4:
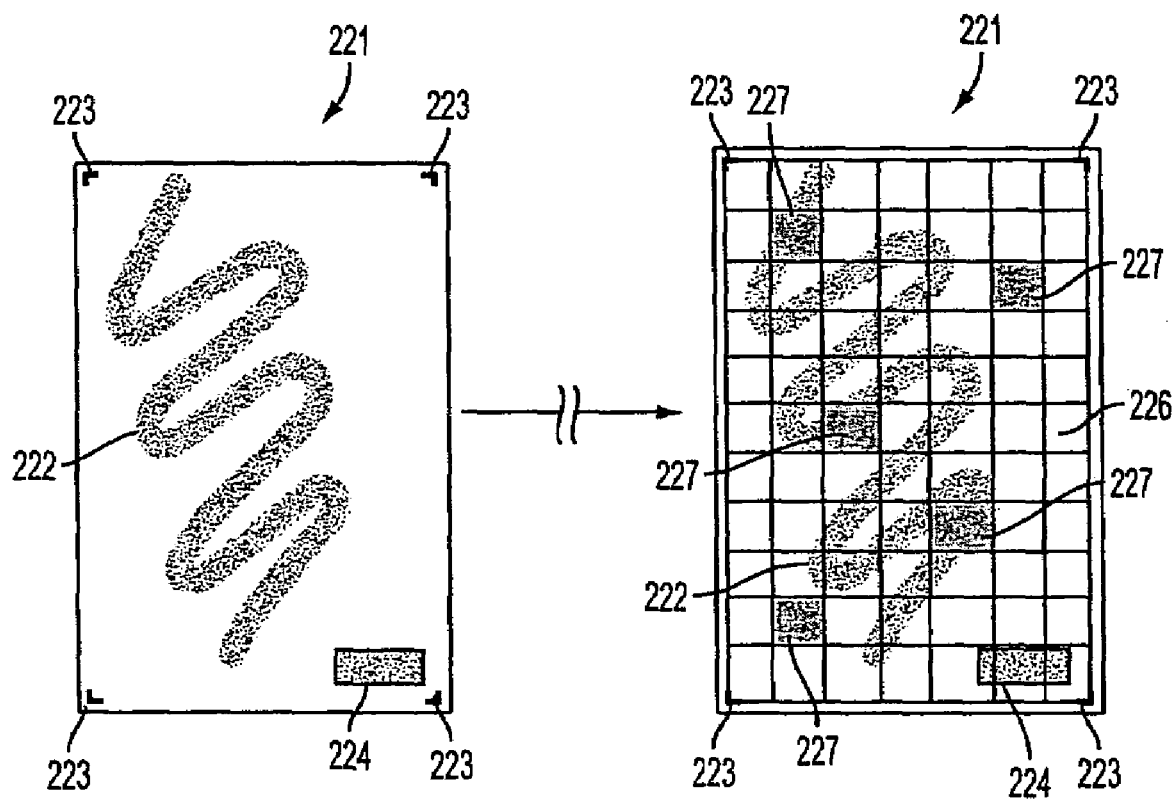
FIG. 4 is a block diagram illustrating the creation of a secure document.

In addition to generating a glyph, the image processing device 12 generates a unique thumb print of the document contents and adds it to the document. FIG. 4 helps illustrates the steps of adding the glyph and the thumb print. As shown in FIG. 4, during the printing of the original document 221 with document contents 222, the image processing device 12 would physically mark each corner 223 of the document 221. Also, a glyph 224 containing the encrypted ID would be added. Within the marked area 225 it would generate an "invisible" grid 226 (used in software, not printed), which it would then use to create a "thumb print" of the document contents 222.

Depending on the strength selected from among the copy protection preferences, the image processing device 12 would randomly select a selection of grid references 227, the higher the strength the more grid references. Before printing, the image processing device 12 would generate a code that represents the data in each of these selected grid locations. Each location's data and the grid reference it represents are then sent to the secure server 21 for storage. This data will act as a document "thumb print" that is unique to each printed document.

Each document that is printed with glyph protection will be watermarked by default (230). This watermark will enable the image reproduction device 20 to detect secure documents even if the glyph has been removed. If the image reproduction device 20 detects a secure document without a glyph, it will inform the user that the glyph has been removed or is unrecognized and refuse to replicate the document. Finally, the document is printed by the image formation device 18 with the appropriate copy protection features included (240).

Figure 5:
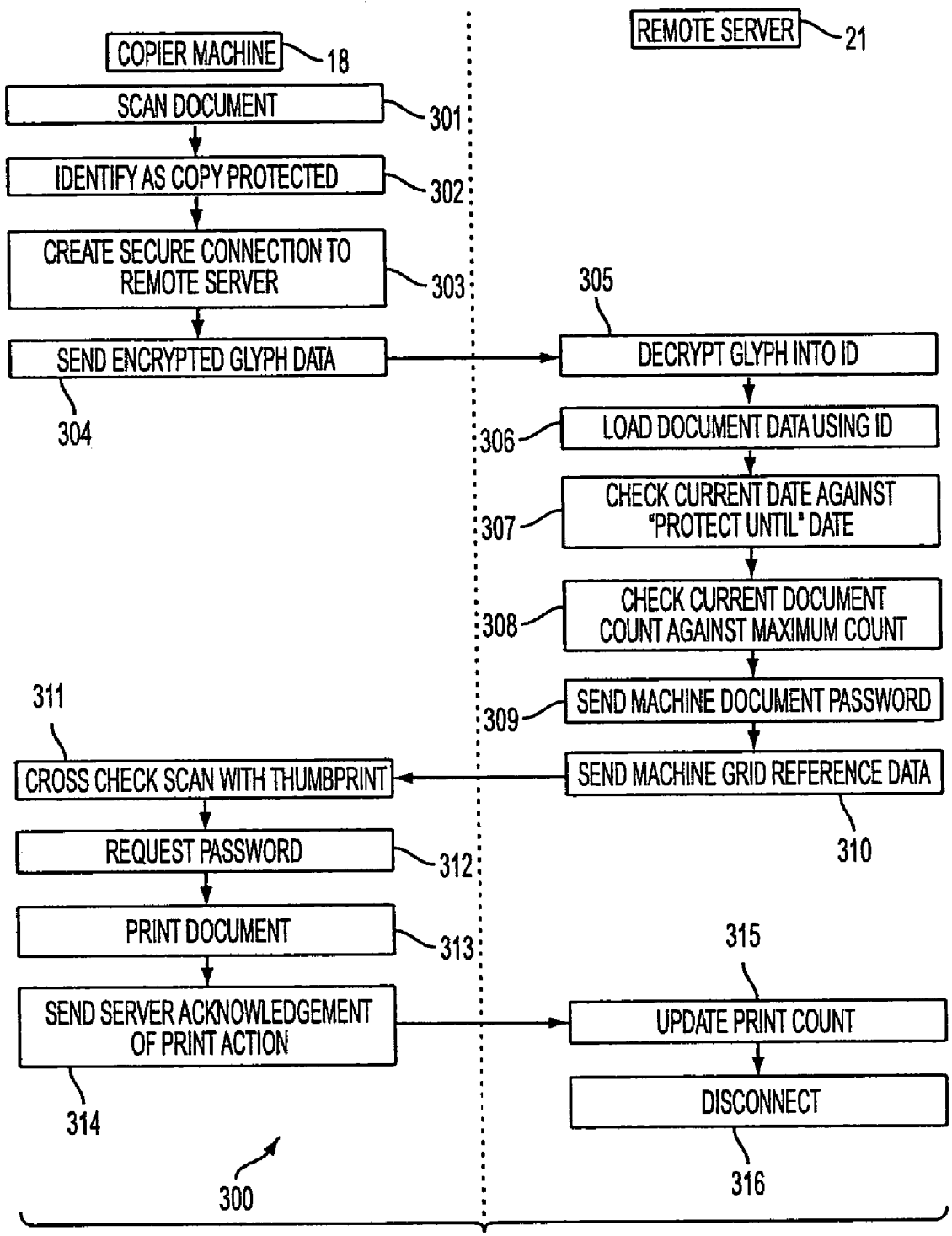
FIG. 5 is a flow chart illustrating a method for confirming a hard copy secure document.

A method 300 for confirming that a printed document may be copied is outlined in FIG. 5. Initially, a document is scanned by the image reproduction device 20 (301). Next, the document is identified as copy protected (302). If the image reproduction device 20 recognizes a secure watermark but no glyph, then the image reproduction device 20 informs the user that the glyph is missing or unrecognizable and refuses to duplicate the document. Next, the image reproduction device 20 creates a secure connection to the remote server 21 (303), and sends the encrypted glyph data to the remote server 21 (304).

The remote server 21 receives the encrypted glyph data and decrypts the data into an ID (305). The remote server 21 then loads the document data from the database 36 using the ID (306). The remote server 21 checks the current date against the "protect until" date (307). Where the current date is after the protect until date, then the server 21 informs the image reproduction device 20 that any number of copies may be made of the document as it has passed its protect until date. The remote server 21 also checks the current document copy count against the maximum copy count (308). Where the copy count has reached its maximum, the server 21 informs the image reproduction device 20 that no more copies may be made of the document and terminates the process. The remote server 21 sends the machine document password (309) and the machine grid reference data, i.e., the document thumb print, to the image reproduction device 20 (310).

The image reproduction device 20 cross-checks the scanned image with the thumb print received from the remote server 21. If the scanned image does not matched the saved thumb print, then the image reproduction device 20 will inform the user that the scanned image and glyph ID do not match and that is therefore unable to produce any copies of the document. Meanwhile, the image reproduction device 20 requests a password from the user (312). If the password given by does not match the one received for the secure document, then the image reproduction device 20 refuses to copy the document and informs the user of the password mismatch. Otherwise, the image reproduction device 20 prints the requested number of copies of the document (313). The image reproduction device 20 sends the server 21 an acknowledgement of the print action (314).

Upon receiving the acknowledgment from the image reproduction device 20, the server 21 updates the copy count and stores the data in the database 36 (315). Finally, the remote server 21 disconnects from the image reproduction device 20 (316).

Thus, when a copy is requested of a secure document, i.e., when the user places a printed secure document into the scanner and requests a copy, the image reproduction device 20 will contact the server 21, identify the document using the glyph ID, download its "thumb print" and cross check it against the document scanned to verify its contents match the original.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A copy protection method comprising:
   receiving copy protection data for a digital document from a user;
   sending the copy protection data for the digital document to a remote server;
   receiving an encrypted ID for the digital document from the remote server;
   generating a data glyph incorporating the encrypted ID and adding the data glyph to the digital document;
   generating a unique thumb print of the digital document and adding the unique thumb print to the digital document;
   adding a watermark to the digital document; and
   printing a hard copy of the digital document via an image formation device.

2. The method defined in claim 1, wherein the copy protection data comprises at least one of strength data, copy count data, password protection data, and protect expiry data.

3. The method defined in claim 1, wherein the image formation device comprises a xerographic printer.

4. The method defined in claim 1, wherein the step of generating a unique thumb print of the digital document comprises:
   physically marking each corner of the document defining a marked area of the document;
   generate a grid within the marked area of the document;
   randomly selecting a plurality of grid references from within the marked area of the document; and
   generating a code that represents the data in each of these selected grid references.

5. The method defined in claim 1, further comprising:
   receiving copy protection data for a digital document from an image processing device at the remote server;
   generating a unique encrypted ID for the digital document;
   storing the copy protection data and the encrypted ID in a database; and
   sending the encrypted ID to the image processing device.

6. A copy confirmation method comprising:
   scanning a document via an image reproduction device;
   identifying the document as copy protected via encrypted glyph data in the document;
   creating a secure connection to a remote server;
   sending encrypted glyph data to the remote server;
   receiving a thumb print and a copy password for the document;
   cross-checking the scanned document with the thumb print;
   requesting a copy password from the user;
   printing at least one hard copy of the document; and
   sending the remote server an acknowledgement of the printing of the document.

7. The method defined in claim 6, wherein the image reproduction device comprises a xerographic copier.

8. A copy confirmation method comprising:
   receiving encrypted glyph data for a document from an image reproduction device;
   decrypting the encrypted glyph data into an ID;
   loading copy protection data for the document using the ID;
   verifying that the document may be copied based on the copy protection data;
   sending a document password and grid reference data to the image reproduction device; and
   receiving print count data from the image reproduction device.

9. The method defined in claim 8, wherein the copy protection data comprises at least one of strength data, copy count data, password protection data, and protect expiry data.

* * * * *